(12) United States Patent
Dufty

(10) Patent No.: US 6,712,155 B1
(45) Date of Patent: Mar. 30, 2004

(54) GROUND ROLLER AND AERATOR MOUNTED CARRIAGE

(75) Inventor: Raymond Jeffrey Dufty, Arundel (AU)

(73) Assignee: Forestfield Pty. Ltd., Mermaid Beach (AU)

( * ) Notice: Subject to any disclaimer, the term of this patent is extended or adjusted under 35 U.S.C. 154(b) by 0 days.

(21) Appl. No.: 09/980,186

(22) PCT Filed: Jun. 30, 2000

(86) PCT No.: PCT/AU00/00784

§ 371 (c)(1),
(2), (4) Date: Nov. 30, 2001

(87) PCT Pub. No.: WO01/01751

PCT Pub. Date: Jan. 11, 2001

(30) Foreign Application Priority Data

Jun. 30, 1999 (AU) .............................................. PQ1337

(51) Int. Cl.[7] ............................. A01B 45/02; A01G 1/12
(52) U.S. Cl. ........................ 172/21; 172/150; 172/151; 172/187; 172/349; 172/554
(58) Field of Search .......................... 172/21, 22, 118, 172/119, 120, 121, 122, 123, 349, 518, 537, 540, 554, 149, 150, 151, 176, 177, 180, 184, 187

(56) References Cited

U.S. PATENT DOCUMENTS

| | | | | |
|---|---|---|---|---|
| 1,354,495 A | * | 10/1920 | Larsen | 172/21 |
| 1,370,219 A | * | 3/1921 | Miller | 172/21 |
| 1,627,422 A | * | 5/1927 | Wike | |
| 1,704,986 A | * | 3/1929 | Marcy | 172/21 |
| 1,955,937 A | * | 4/1934 | Allen | 172/21 |
| 2,881,847 A | * | 4/1959 | Strasel | 172/21 |
| 2,912,813 A | * | 11/1959 | Ellsworth | 172/21 |
| 2,966,218 A | * | 12/1960 | Johnson | 172/21 |
| 3,062,300 A | * | 11/1962 | Bullard | 172/21 |
| 3,685,469 A | * | 8/1972 | Rogers | 172/21 |
| 3,881,553 A | * | 5/1975 | Angeski | 172/21 |
| 3,939,917 A | * | 2/1976 | Reed, Jr. et al. | 172/21 |
| 4,155,315 A | * | 5/1979 | Dobbins | 172/21 |
| 4,678,042 A | * | 7/1987 | Barton et al. | 172/21 |
| 4,702,828 A | * | 10/1987 | Mehmert et al. | 172/21 X |
| 4,923,016 A | * | 5/1990 | Moise | 172/21 |
| 5,038,868 A | * | 8/1991 | Rinelli | 172/21 |
| 5,101,910 A | * | 4/1992 | Dawson | 172/21 |
| 5,142,852 A | * | 9/1992 | Nelson | 172/21 X |
| 5,287,934 A | * | 2/1994 | Porter | 172/21 |
| 5,398,769 A | * | 3/1995 | Staples | 172/21 |
| 5,533,577 A | * | 7/1996 | Jucker | 172/21 |
| 5,641,025 A | * | 6/1997 | Kawaguchi | 172/21 |
| 6,460,624 B1 | * | 10/2002 | Dufty | 172/21 |

FOREIGN PATENT DOCUMENTS

| | | | | |
|---|---|---|---|---|
| AU | 111662 | | 10/1940 | |
| AU | 151191 | | 4/1953 | |
| AU | 254567 | | 9/1964 | |
| AU | 28109/99 | | 1/2000 | |
| FR | 2707830 | * | 1/1995 | 172/21 |
| GB | 2187372 A | * | 9/1987 | 172/21 |
| JP | 07308103 A | * | 5/1994 | |
| SU | 1056936 | * | 10/1982 | |
| WO | WO99/09802 | | 3/1999 | |
| WO | WO99/09809 | | 3/1999 | |

* cited by examiner

Primary Examiner—Christopher J. Novosad
(74) Attorney, Agent, or Firm—Fredrikson & Byron PA

(57) ABSTRACT

Carriage (10) attachable to a prime mover (41) for travel over turf or grass wherein the carriage (10) has idler rollers (12, 13 and 14) and a ground aeration mechanism in the form of a support axle (15) having a plurality of slicer blades (16) attached thereto. There is also provided a housing (11) having a hollow interior (33) which houses rollers (12, 13 and 14) and ground aeration mechanism (15 and 16). In use, when carriage (10) travels over turf or grass, both rollers (12, 13 and 14) and the ground aeration mechanism (15 and 16) operate simultaneously to not only roll the grass but also slice it for the purpose of facilitating moisture penetration.

21 Claims, 10 Drawing Sheets

GROUND ROLLER AND AERATOR MOUNTED CARRIAGE

This invention relates to a roller mounted carriage which also may function as a ground aerator.

Conventional machines which have a dual purpose function in ground aeration as well as ground rolling are well known and reference may be made, for example, to AU 111662, AU 254567, International Publication No. WO99/09802 and International Publication No. WO99/09809.

International Publication No. WO99/09802, in particular, refers to ground aeration apparatus having a main frame which has a support axle having a plurality of spaced cutters or slicer blades mounted thereon as well as a pair of undercarriages mounted to the main frame which were located adjacent the support axle. Each undercarriage supported a plurality of unevenly spaced idler rollers. In this regard, each idler roller was pivotable about a universal axis and each undercarriage was pivotable about a horizontal axis. This specific arrangement is illustrated in International Publication No. WO99/09809. This enabled each idler roller to closely follow ground contours in use.

However, in operation, it was found that the combined ground aerator and roller of International Publication No. WO99/09802 was complicated in construction in having a ground slicer mounted adjacent to each of the roller undercarriages and this arrangement also meant that the undercarriages had to be restricted in width for satisfactory operation. Also, the apparatus of International Publication No. WO99/09802 could not satisfactorily be used in relation to golfing greens of irregular or complicated shape.

It was also to be appreciated that in some circumstances it was desired to attach the apparatus of International Publication No. WO99/09802 to a tractor and this was not appropriate because the apparatus of International Publication No. WO99/09802 was provided with a driver roller attached to the main frame as well as a driver's seat mounted on top of the main frame.

It is therefore an object of the invention to provide a roller mounted carriage which may also have a ground aeration function so as to alleviate the disadvantages of the prior art described above.

Accordingly, the invention refers to a carriage having at least one but more preferably a plurality of idler rollers as well as a ground aeration mechanism.

More preferably the carriage is provided with a body or housing which has a hollow interior in which the idler rollers and the ground aeration mechanism are located. Preferably the ground aeration mechanism is provided by a support axle having a plurality of slicer blades attached or mounted thereto which may be spaced from each other by spacers located between each of the adjacent slicer blades. Ideally each of the slicer blades attached to the support axle are offset with regard to each other to facilitate efficient ground aeration.

Preferably the carriage of the invention has three ground contacting idler rollers and the support axle for each of the slicer blades may be located between one idler roller at one end of the carriage and a pair of ground contacting rollers located at another end of the carriage.

Each of the idler rollers may be mounted to the carriage in any suitable fashion but are preferably only attached by a suitable roller axle to the housing. In this embodiment, it is possible to dispense with the combination of horizontal pivot mount as well as universal pivot mount which was used in International Publication No. WO99/09802 and allow such pivotal motion to be imparted to each of the carriages by the action of the prime mover as hereinafter described. In this regard, the prime mover can take over substantially all of the steering of the carriage of the invention which was not possible with the apparatus described in International Publication No. WO99/09802. This meant that the carriage of the invention is much simpler to operate and also has a much simpler construction when compared to the roller mounted undercarriages described in International Publication No. WO99/09802.

The support axle for the slicing mechanism may also be mounted to the housing in any suitable manner and preferably the support axle or shaft is attached to a depth adjustment frame which may be pivotally attached to the housing. The depth adjustment frame may be moved relative to the housing from a disengaged or non-operative position to an engaged or operative position. Preferably there is also provided an intermediate position between these extremes wherein each of the slicer blades are partly engaged with the ground.

The depth adjustment frame may also be mounted to an adjacent roller axle and the frame may be movable longitudinally so as to release the slicer mechanism from a particular depth as described above and move the frame to a new depth location as required by the operator. In this embodiment, the depth adjustment frame may be supported in a reciprocatable manner on a pair of cranks at each side of the housing whereby locating pins of each side rail of the frame may engage in mating slots located in each crank. However, more preferably, locating pins of each crank engage in mating slots located in each side rail of the frame.

The carriage may also have attached thereto a mounting frame which may pivotally engage with a prime mover support frame as hereinafter described at one end of the carriage. The carriage at another end may be provided with a pivotal mount for pivotal attachment to the prime mover support frame to facilitate tilting of the carriage about a transverse axis as hereinafter described.

The carriage may be attached to a prime mover of any suitable type, such as a tractor with a three point linkage for operation on golfing greens, sports ovals or golf fairways. However, preferably the prime mover is provided with a support frame which is hydraulically operated so that the support frame "floats" on the carriage in use as hereinafter described.

Reference may now be made to a preferred embodiment as shown in the attached drawings, wherein.

Figure 1:
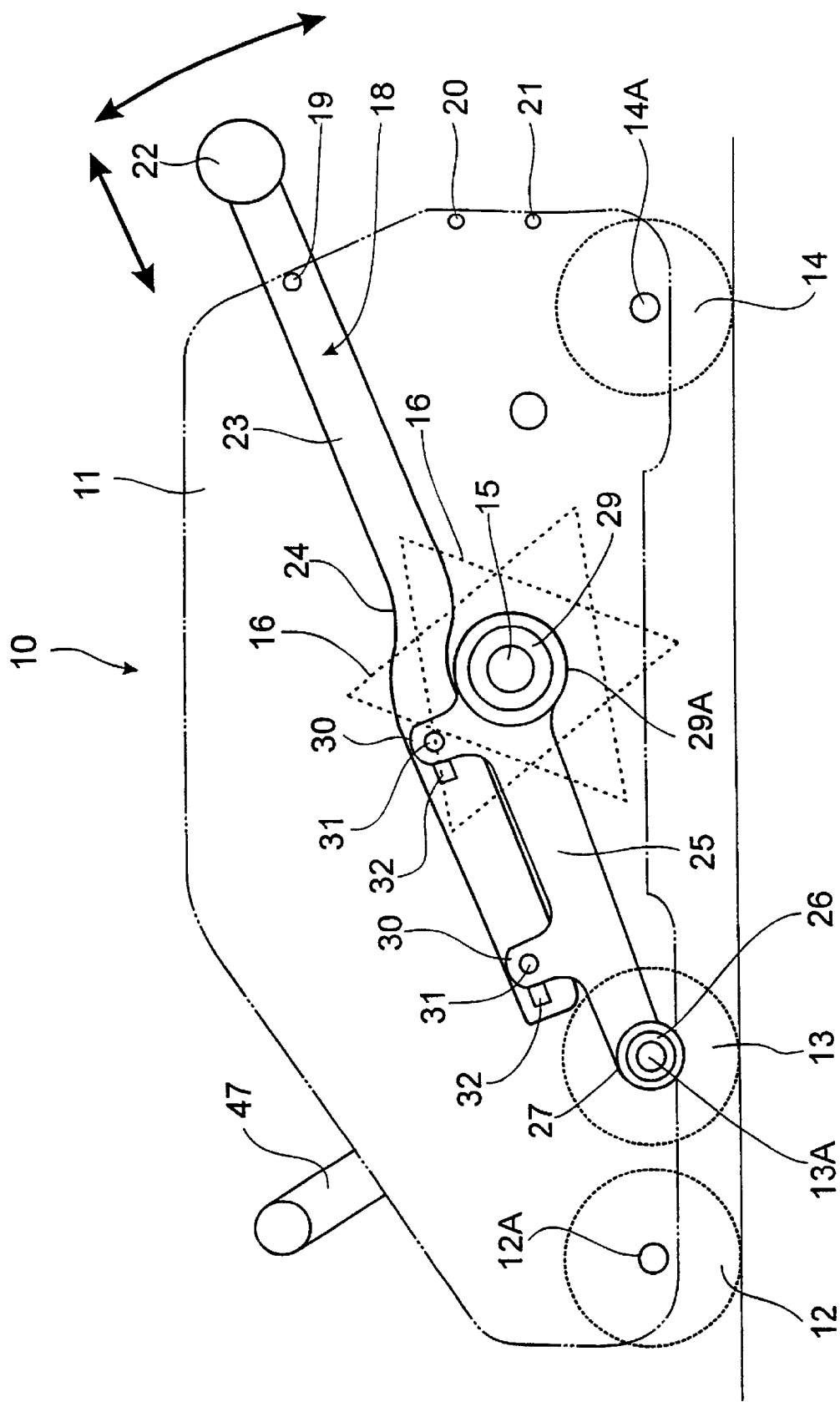
FIG. 1 is a side view of the roller mounted carriage.
Figure 2:
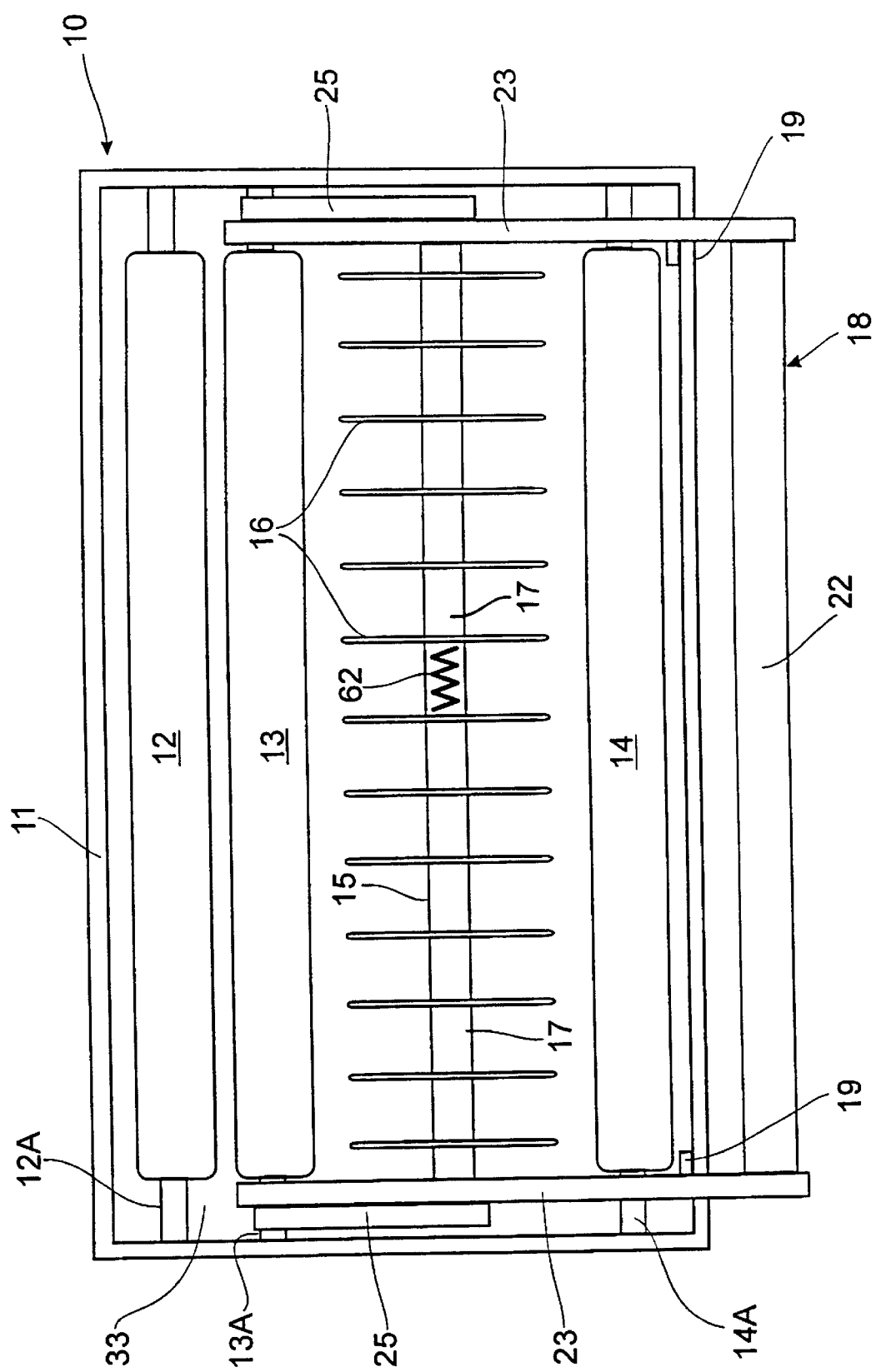
FIG. 2 is a bottom plan view of the roller mounted carriage of FIG. 1.

In FIGS. 1–2, there is shown a roller mounted carriage 10 having a housing or body 11 which body is supported by ground contacting and unevenly spaced idler rollers 12, 13 and 14 mounted on axles 12A, 13A and 14A. There is also provided a slicer shaft or axle 15 having a plurality of slicer blades 16 attached thereto which are separated by spacers 17. There is also provided a depth adjustment frame 18 for slicer shaft 15 shown in FIG. 1 which provides for setting of slicer shaft 15 at a disengaged position as defined by locating pin 19. An intermediate or partly engaged position is shown at 20 and a fully engaged position is shown as 21. The depth adjustment frame 18 also has handle 22.

The depth adjustment frame 18 has opposed side rails 23 which are each curved or stepped at 24. There is also provided a pair of cranks 25 which are each pivotally attached to roller axle 13A with the assistance of bearing 26 which locates in a retaining aperture or tubular spigot 27 of each crank 25. Each crank 25 is also pivotally attached to slicer shaft 15 by bearing 29 which is located in a retaining tubular spigot or aperture 29A of each crank 25.

Each crank 25 is also provided with projections 30 each having a locating pin 31 which locate in mating slots 32 which are provided in each side rail 23.

It will also be appreciated from FIG. 1 that each slicer blade 16 is offset relative to an adjacent slicer blade to facilitate ground penetration. As best shown in FIG. 2, housing 11 has a hollow interior 33 to accommodate rollers 12, 13 and 14 as well as slicer shaft 15 and attached slicer blades 16.

Figure 3:
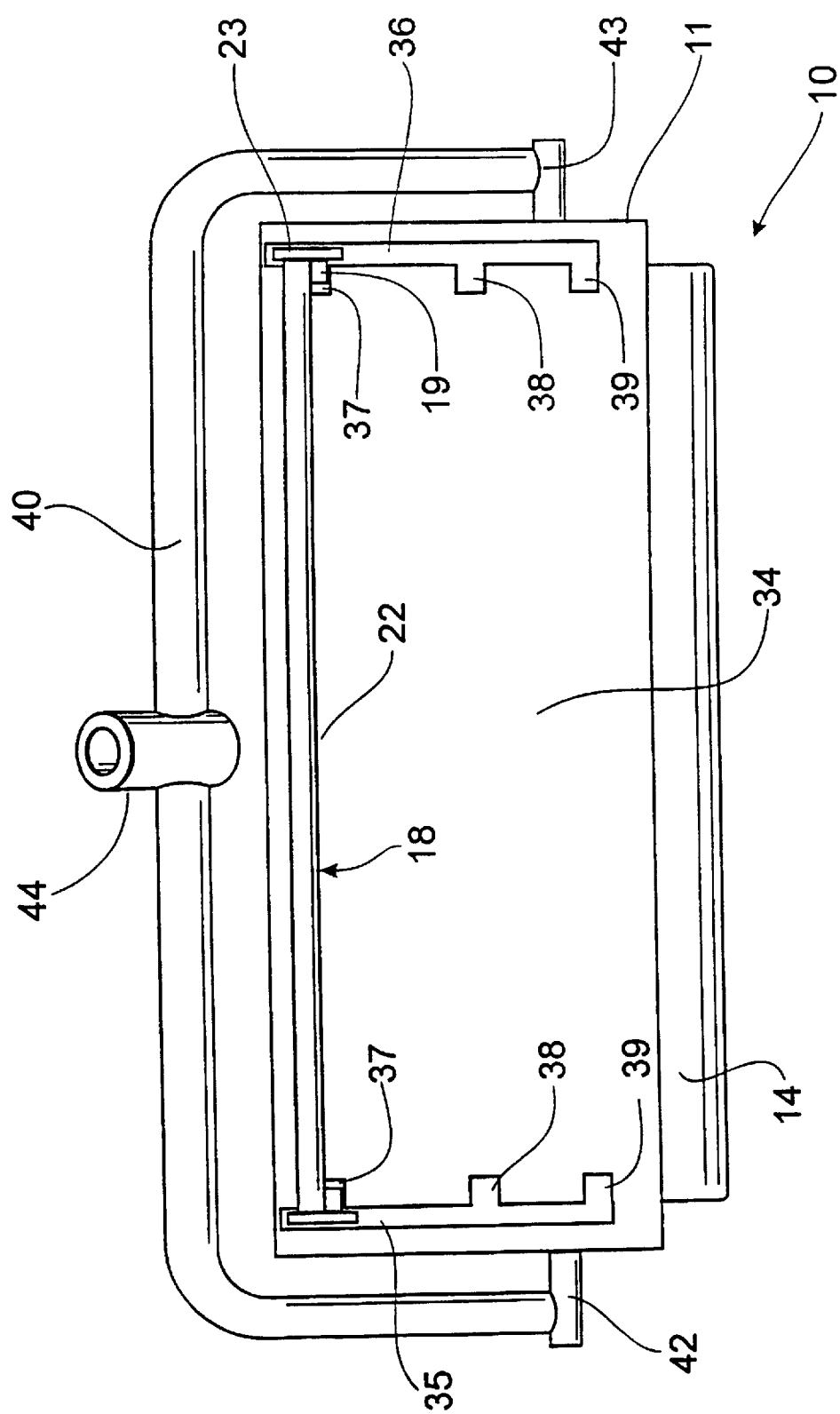
FIG. 3 is a front view of the roller mounted carriage of FIG. 1.

In FIG. 3, there is also shown a front wall 34 of housing 11 which incorporates elongate slots 35 and 36 and associated lateral retaining notches 37, 38 and 39 for retention of locating pins 19 of depth adjustment frame 18. Notches 37, 38 and 39 correspond to positions 19, 20 and 21 previously described. There is also provided mounting frame 40 for mounting of carriage 10 to a prime mover 41 illustrated hereinafter. Mounting frame 40 is pivotally attached to housing 11 at 42 and 43 and includes socket 44.

In FIGS. 4–9, there is shown the attachment of a roller mounted carriage 10 to a prime mover 41 having ground engaging wheels 41A and cabin 41B. In this regard, there is provided a prime mover support frame 45 as well as opposed pivot arms 46 pivotally attached to an associated carriage mount 47 at 48. The support frame 45 also includes longitudinal frame members 49 each pivotally attached to an adjacent arm 46 at 50 and frame members 51 which are pivotally connected to each other to frame member 52 at 53. Each of frame members 49 are connected to socket 44 by the use of retaining pin 55.

Figure 6:
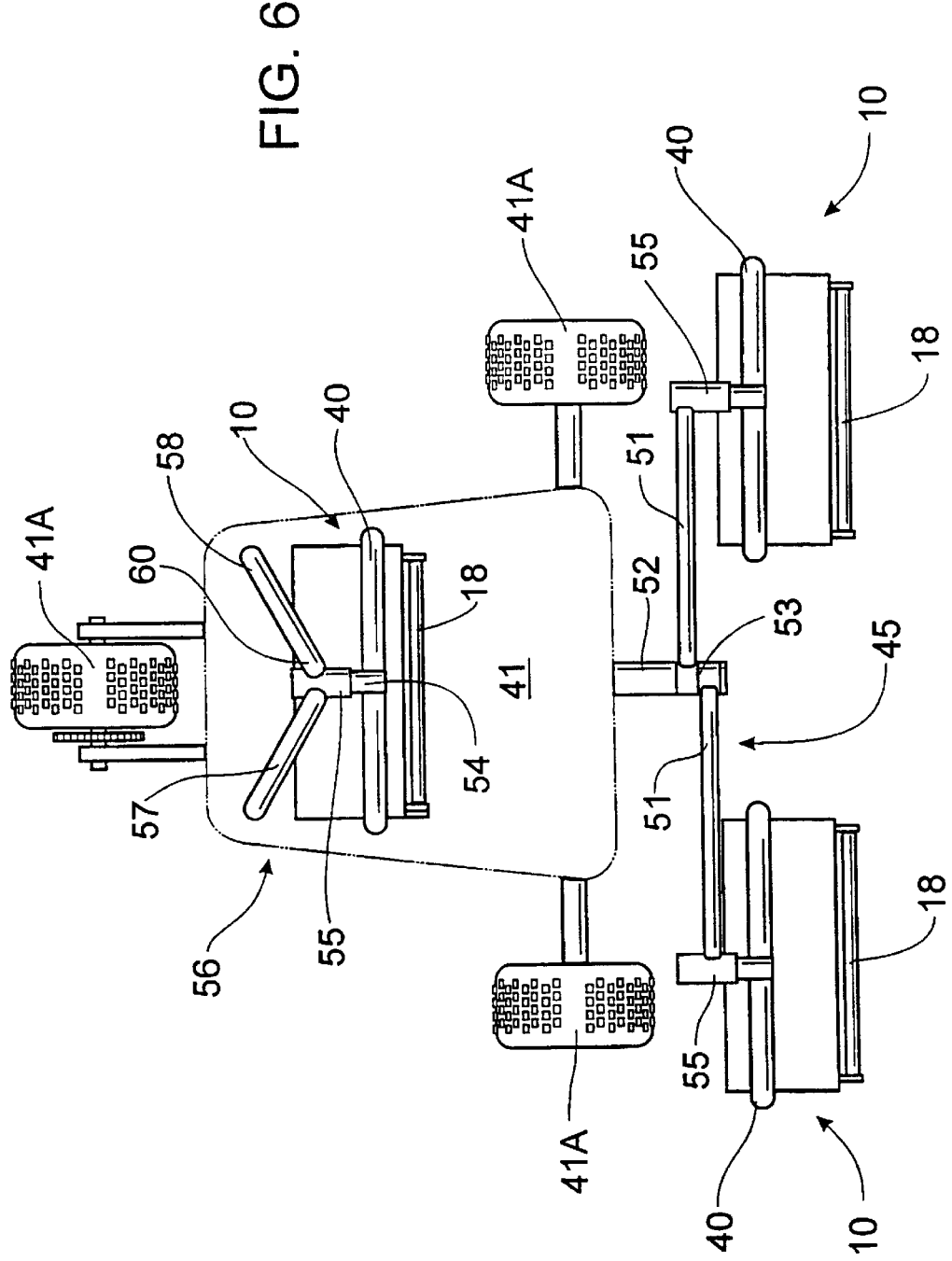
FIG. 6 is a plan view of a prime mover having three roller mounted carriages of FIG. 1 attached thereto.
Figure 7:
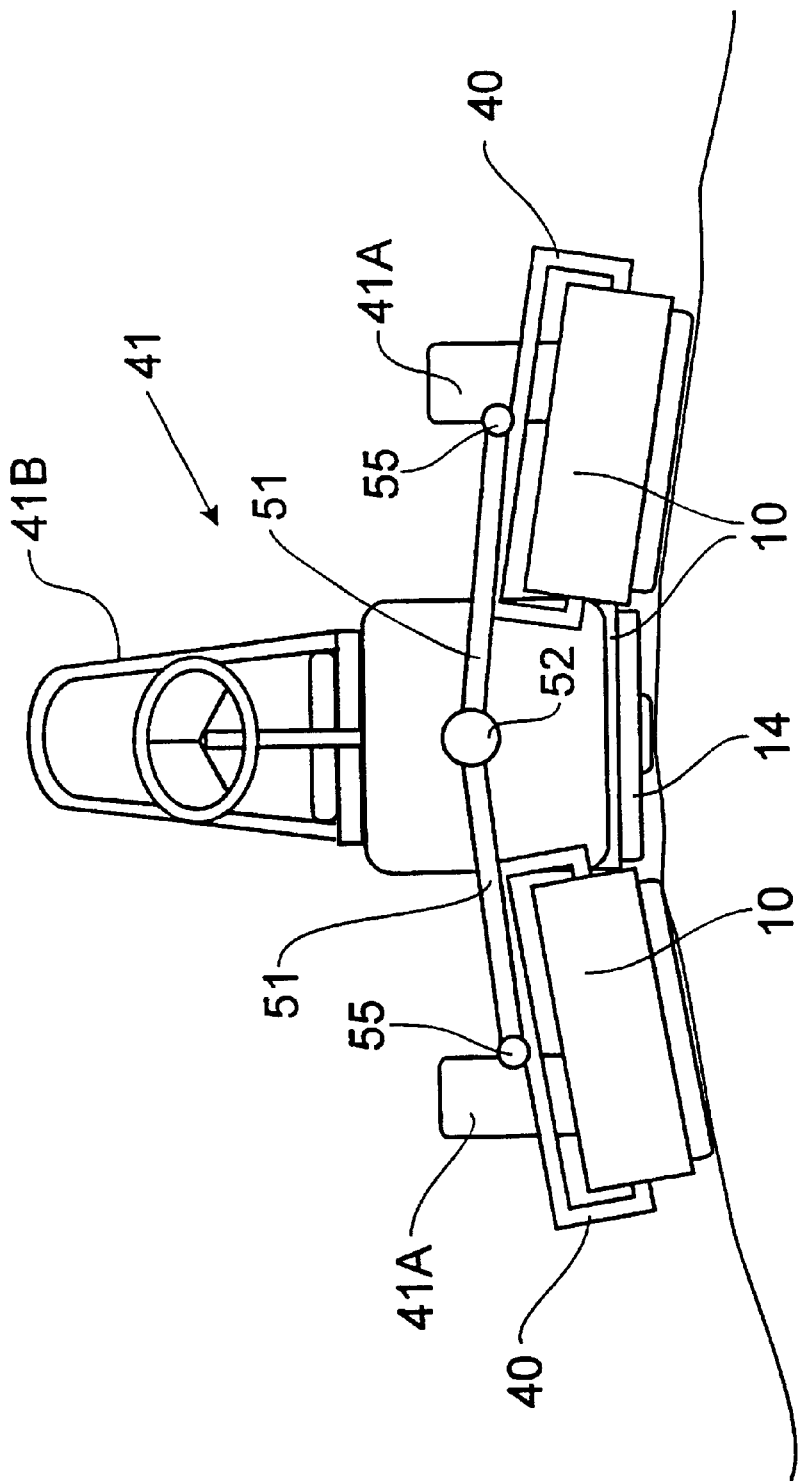
FIG. 7 is a front view of the prime mover and attached roller mounted carriages of FIG. 6.

As best shown in FIG. 6, the rear roller mounted carriage 10 has mounting arm 40 pivotally attached to prime mover support frame 56 at 54. Support frame 56 includes frame members 57, 58 and 55 which are each pivotally connected to each other at 60.

The support frame 45 and pivot arms 46 as well as support frame 56 are shown schematically since they are well known in the art, e.g. being part of the TRIPLEX mower, details of which are incorporated herein by reference. Installation of carriages 10 may be accomplished readily by removal of the conventional TRIPLEX cutting heads and substitution thereof by carriages 10.

In operation of the roller mounted carriage 10 of the invention, it will be appreciated from FIG. 1 that adjustment frame 18, as shown by the arrows in full outline, may move linearly as shown by locating pins 31 engaging in mating slots 32 as well as in an arcuate fashion by locating pin 19 engaging in selected retaining notches 37, 38 and 39 as shown in FIG. 3. Each side rail 23 may slide or move linearly with respect to associated cranks 25 to facilitate release of locating pins 39 from notches 37, 38 and 39 when required and to select a new depth position for adjustment frame 18 from each of the positions shown in FIG. 1.

Each of slicer blades 16 are separated by spacers 17 as shown in FIG. 2 and there also may be provided one or more compression springs 62 if required.

It will also be appreciated that while one roller mounted carriage 10 may be attached to a primer mover, it is preferred that a plurality of roller mounted carriages (e.g. three) be mounted to prime mover 41 as shown in FIGS. 4–9.

Figure 4:
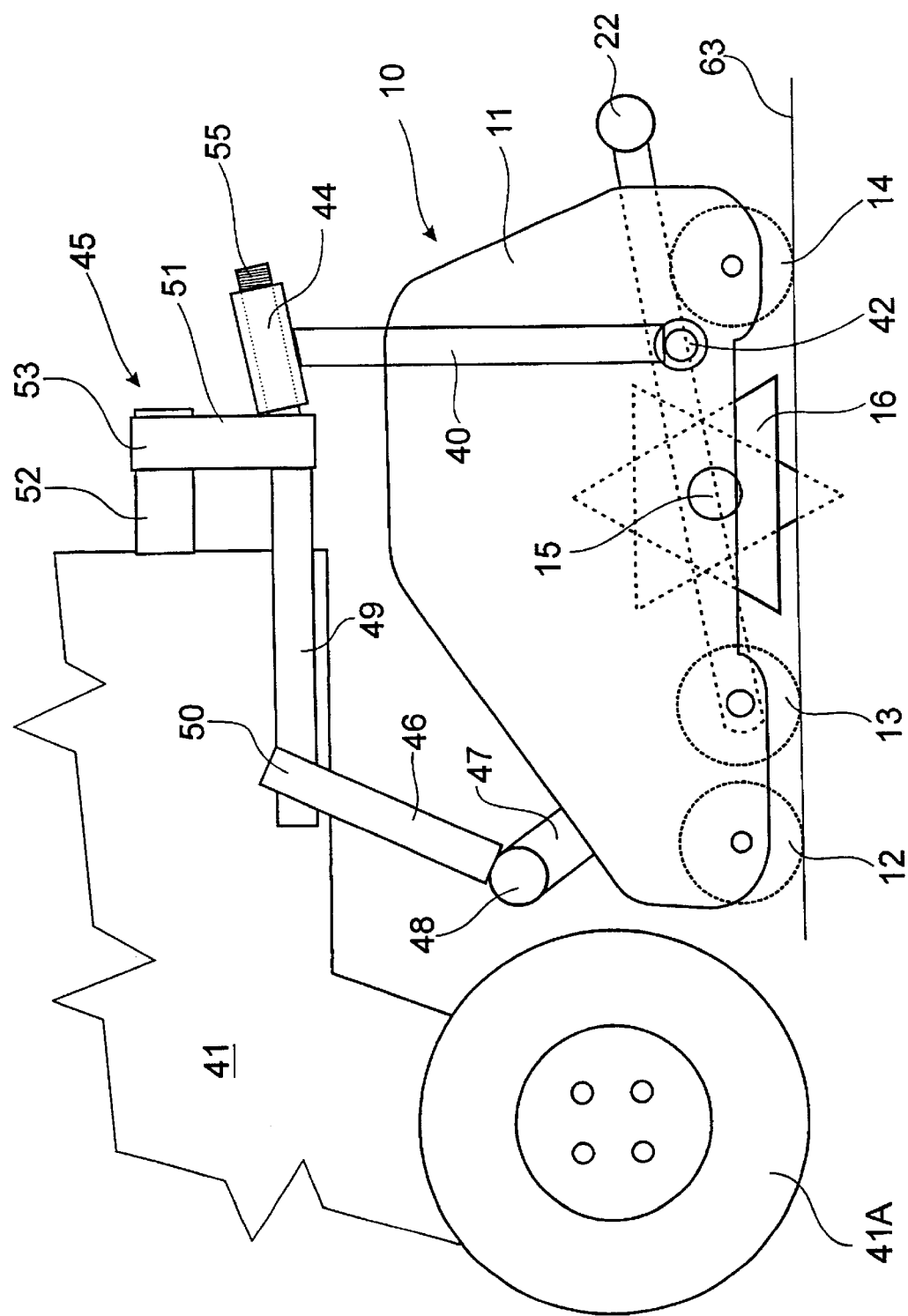
FIG. 4 is a side view of the roller mounted carriage of FIG. 1 attached to a prime mover.
Figure 5:
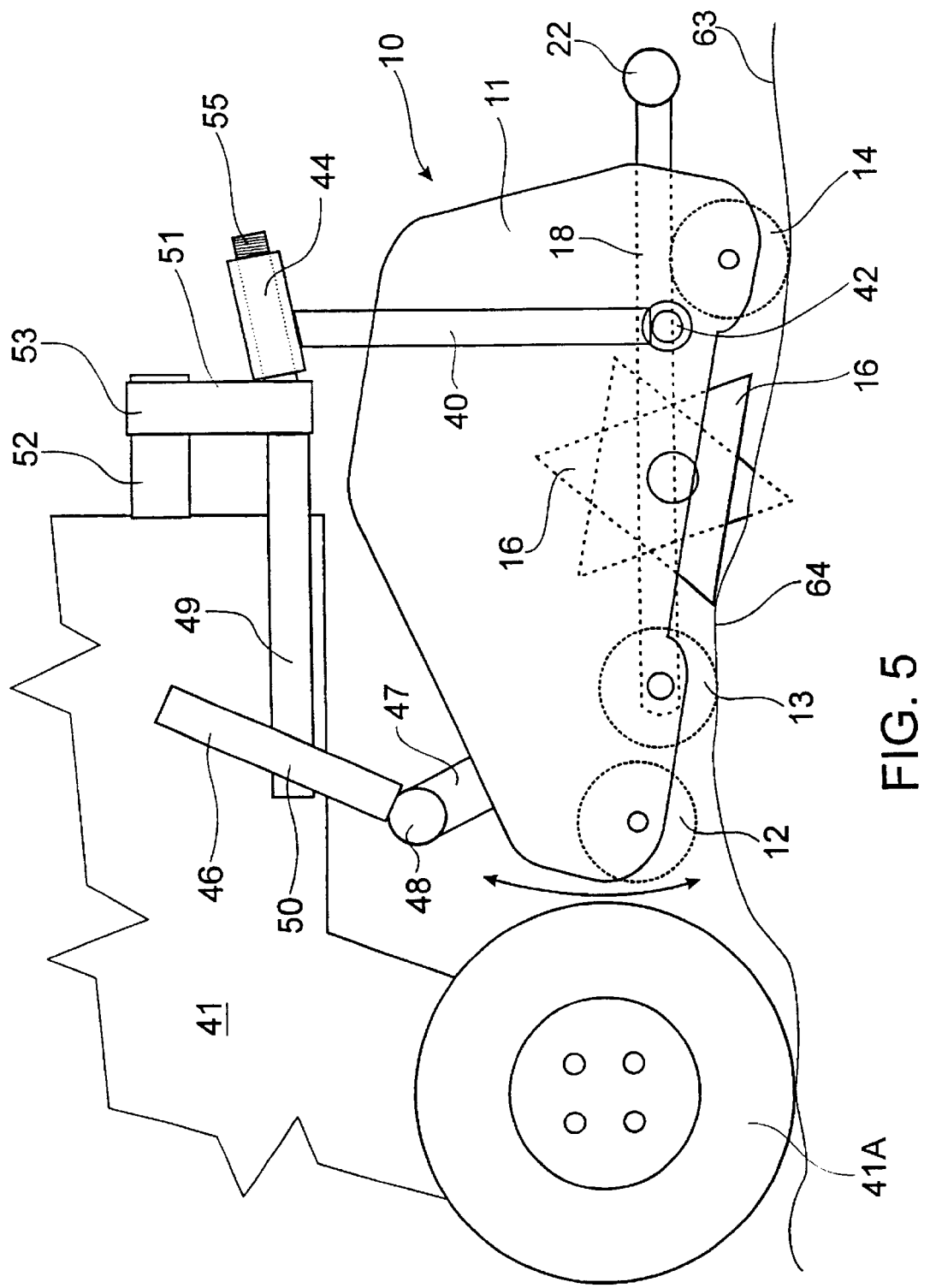
FIG. 5 is a similar view to FIG. 4 showing pivotal movement of the roller mounted carriage in response to ground undulations.
Figure 8:
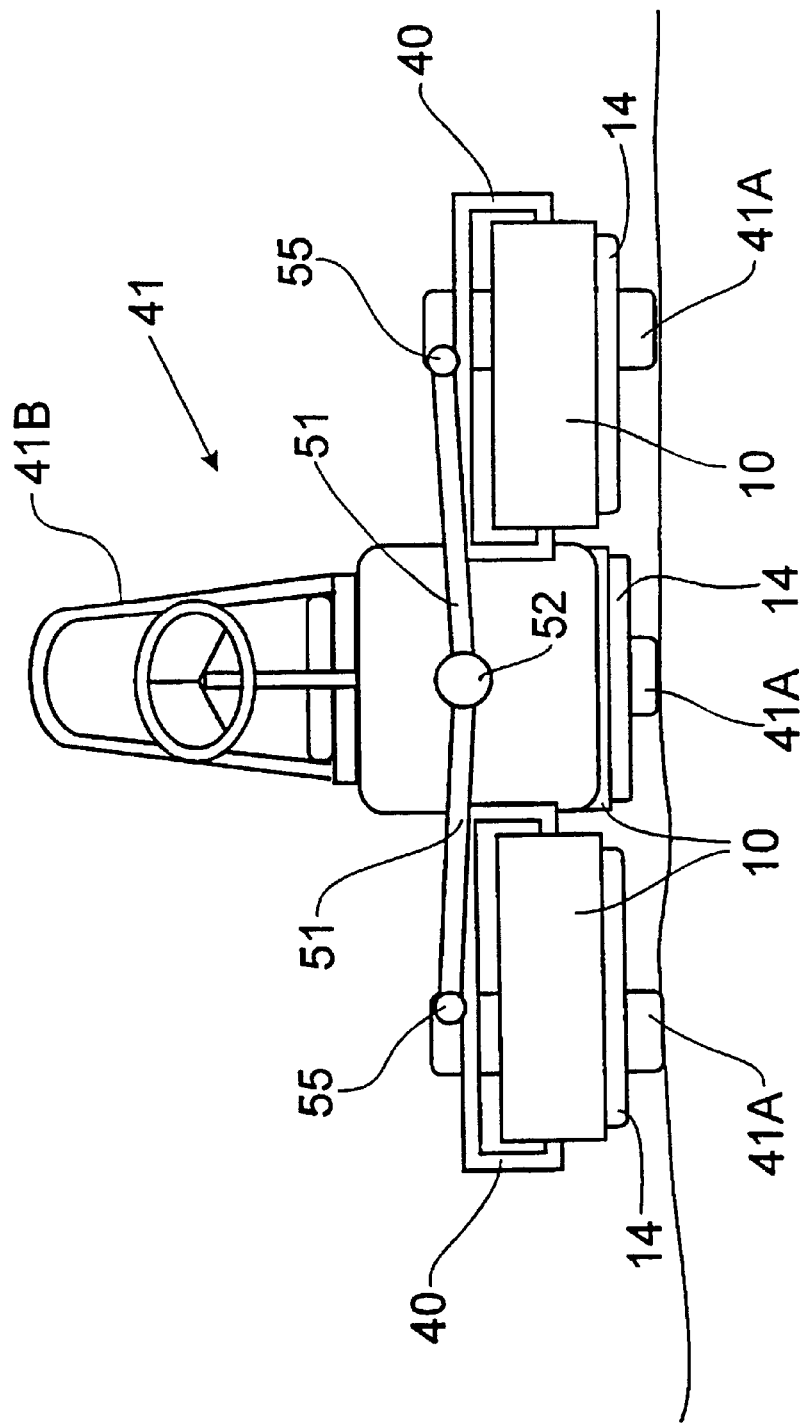
FIG. 8 is a similar view to FIG. 7 but showing the roller mounted carriages attached to the prime mover being clear of the ground.

FIG. 4 shows this arrangement when a roller mounted carriage 10 is moving on level terrain shown by ground 63 but when the carriage 10 encounters a small hillock or undulation 64 as shown in FIG. 5 the rear end of the carriage moves upwardly as shown by the arrow in full outline. This is due because of the pivotal attachment of attachment frame 40 to carriage 10 at 42 and 43 and the pivotal attachment at 48. The pivot arms 46 move upwardly and downwardly in relation to frame members 49 as clearly shown in FIGS. 4–5 to facilitate the rear end of the carriage 10 to follow the contour of undulation 64. This occurs without any downward pressure being applied to carriage 10 by prime mover support frame 45 and pivot arms 46. The frame members 46, 49, 51 and 55 "float" to achieve this mode of action. The only weight applied to a particular carriage 10 is the weight of the frame members 49, 51 and 55 and pivot arms 46 when each carriage 10 is contacting the ground. Each of the members 46, 49, and 55 are hydraulically controlled to raise and lower carriage 10 from an operative or ground contacting mode to an elevated or inoperative or traveling location clear of the ground as shown in FIG. 8 when compared to FIG. 7 which shows each carriage 10 in the ground contacting position. The attachment frame 56 for the rear carriage 10 shown in FIG. 6 functions in a similar manner.

Figure 9:
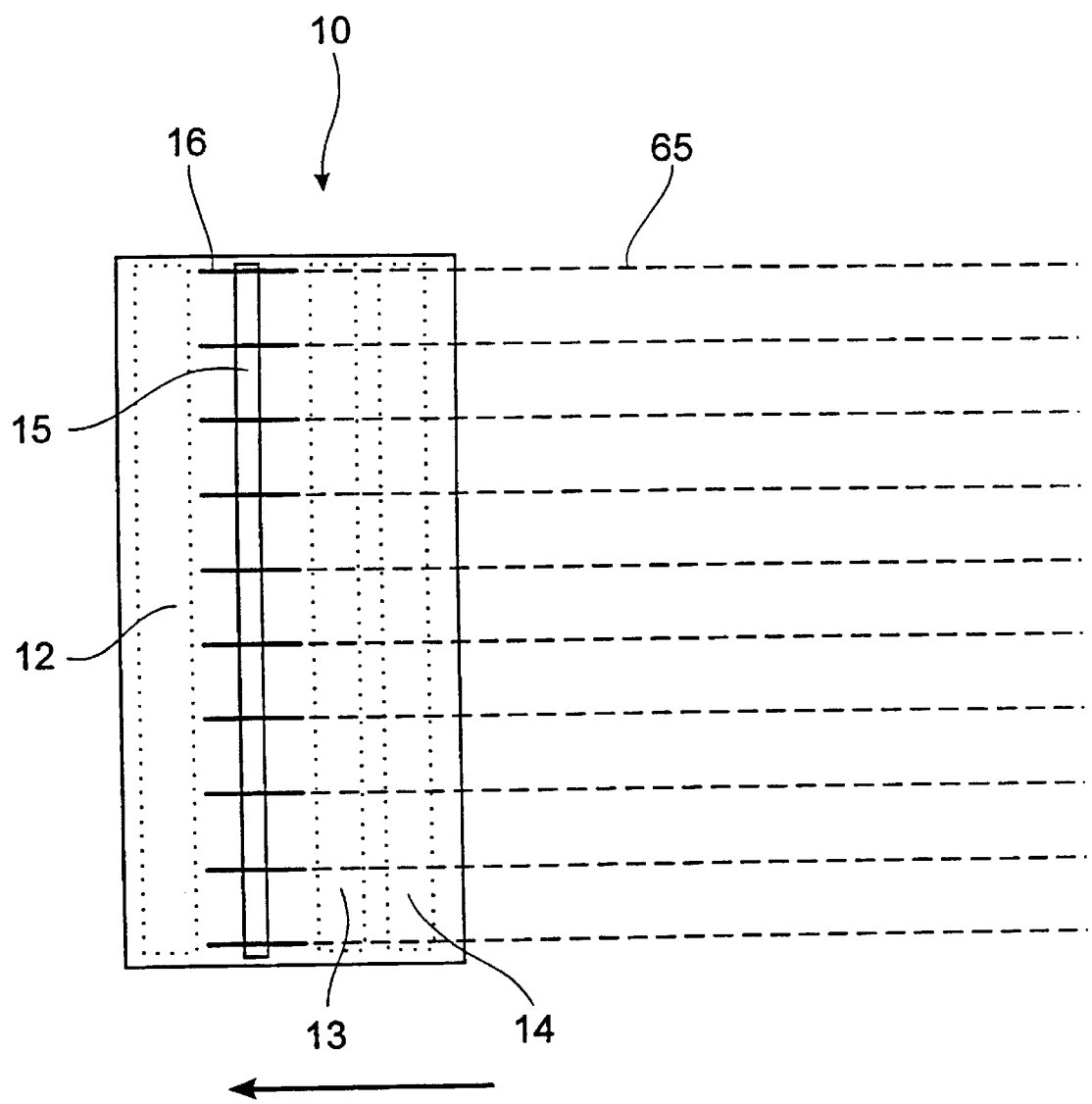
FIG. 9 is a plan view of a single roller mounted carriage of FIG. 1 showing slices imparted to the ground after a single traverse.

In FIG. 9, there is also shown longitudinal slicing marks 65 imparted to the ground after passage of an individual roller mounted carriage 10.

Figure 10:
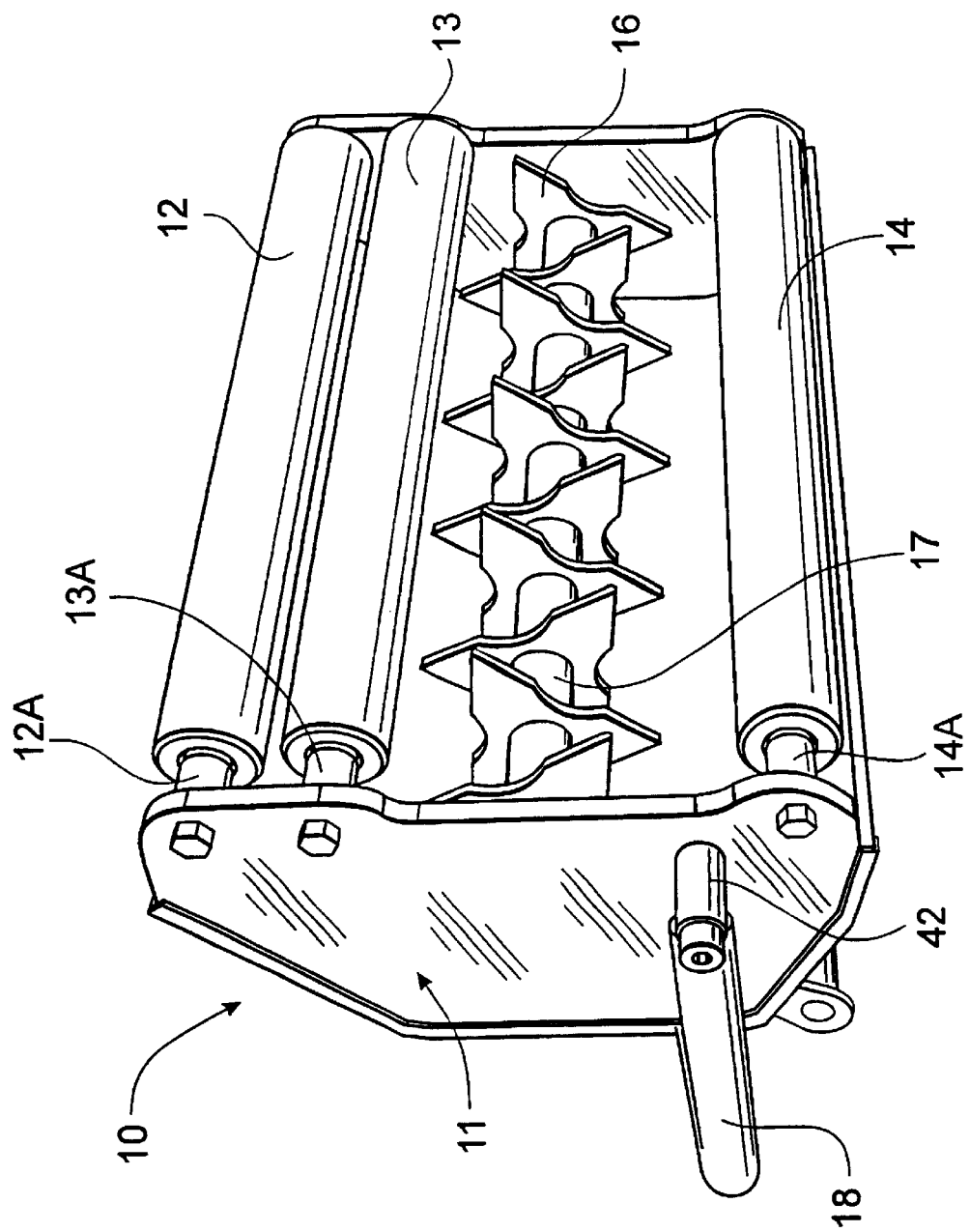
FIG. 10 is a perspective view of the roller mounted carriage shown in FIG. 1.

FIG. 10 shows a perspective view of carriage 10 and the arrangement of rollers 12, 13 and 14 and slicer axle 15 and attached slicer blades 16.

The roller mounted carriage of the invention, as will be apparent from the foregoing, has marked advantages over the prior art in that:

(i) for the first time an individual carriage or rolling head can provide a ground slicing or ground aeration function simultaneously with a rolling function;

(ii) as a result of (i), both the mode of operation and construction of dual purpose machines having a ground aeration function and rolling function are considerably simplified;

(iii) it is now possible for the rolling/slicing carriages to be applied to a golfing green regardless of its shape;

(iv) the rolling/slicing carriages of the invention may have an unlimited width for use on not only golfing greens but also fairways, sporting ovals, cricket grounds and football grounds; and (v) the rolling/slicing carriages of the invention may be mounted to any suitable prime mover which includes a small tractor or tractor having a conventional three point linkage as well as the TRIPLEX mower described above.

(vi) the rollers of carriage 10 work on the "high spots" of a golfing green making them "true" to produce a perfect surface on which to putt. The slicing blades 16 can be at full depth or half depth and can intermittently slice into the green surface, which relieves surface tension, helps moisture and wetting agents penetrate the surface of the green or in the case of excess water assist with moisture dispersion. The rollers also remove surface irregularities and "pitch" marks, reduce stress imparted to the greens and reduce mowing and maintenance costs.

What is claimed is:

1. A carriage attachable to a prime mover for travel over turf or grass comprising:
   (i) a ground aeration mechanism mounted on a support axle extending transversely of the carriage;
   (ii) at least one roller mounted on a roller axle extending transversely of the carriage;
   (iii) a depth adjustment frame for the support axle and oriented longitudinally thereto movable from a non operative position wherein the ground aeration mechanism is clear of the ground to an operative position wherein the ground aeration mechanism penetrates the ground and;
   (iv) a pair of cranks pivotally supporting the depth adjustment frame on both sides thereof;
   which has a mounting frame at one end thereof for pivotal attachment to a prime mover support frame.

2. The carriage as claimed in claim 1 wherein there is provided a pivotal mount at another end for pivotal attachment to the prime mover support frame.

3. A carriage attachable to a prime mover for travel over turf or grass comprising:
   (i) a ground aeration mechanism mounted on a support axle extending transversely of the carriage;
   (ii) at least one roller mounted on a roller axle extending transversely of the carriage;
   (iii) a housing having a hollow interior which houses the support axle and said one roller axle;
   (iv) a depth adjustment frame for the support axle and oriented longitudinally thereto movable from a non operative position wherein the ground aeration mechanism is clear of the ground to an operative position wherein the ground aeration mechanism penetrates the ground and;
   (v) a pair of cranks pivotally supporting the depth adjustment frame on both sides thereof.

4. The carriage as claimed in claim 3 wherein the support axle has a plurality of slicer blades attached thereto.

5. The carriage as claimed in claim 4 wherein the slicer blades are spaced from each other by spacers located between adjacent slicer blades.

6. The carriage as claimed in claim 5 wherein the slicer blades are offset in relation to each other.

7. The carriage as claimed in claim 4 wherein a depth adjustment frame is movable to an intermediate position between a non-operative position and an operative position whereby in said intermediate position each of the slicer blades are partly engaged with the ground.

8. The carriage as claimed in claim 7 wherein locating pins of each crank engage in mating slots in an adjacent side rail.

9. The carriage as claimed in claim 8 wherein each side rail of the depth adjustment frame is stepped or curved intermediate its length.

10. The carriage as claimed in claim 3 having three ground contacting rollers all mounted on associated roller axles.

11. The carriage as claimed in claim 10 wherein said ground contacting rollers are unevenly spaced.

12. A carriage attachable to a prime mover for travel over turf or grass comprising:
   (i) a ground aeration mechanism mounted on a support axle extending transversely of the carriage;
   (ii) at least one roller mounted on a roller axle extending transversely of the carriage;
   (iii) a depth adjustment frame for the support axle and oriented longitudinally thereto movable from a non operative position wherein the ground aeration mechanism is clear of the ground to an operative position wherein the ground aeration mechanism penetrates the ground and;
   (iv) a pair of cranks pivotally supporting the depth adjustment frame on both sides thereof;
   wherein the depth adjustment frame has a pair of side rails and each crank supports an adjacent side rail of the depth adjustment frame.

13. The carriage as claimed in claim 12 wherein each crank interconnects the support axle and the roller axle and is pivotally attached to the support axle and the roller axle.

14. The carriage as claimed in claim 12 wherein each crank has a pair of projections which are each mounted in a retaining slot of said adjacent side rail.

15. A carriage attachable to a prime mover for travel over turf or grass, said carriage comprising:
   (i) a ground aeration mechanism mounted on a support axle;
   (ii) a plurality of rollers each mounted on a respective roller axle;
   (iii) a housing having a hollow interior which houses the support axle and said one roller axle;
   (iv) a mounting frame at one end thereof for pivotal attachment to a prime mover support frame; and
   (v) a mount at another end for pivotal attachment to the prime mover support frame.

16. The carriage as claimed in claim 15 wherein there are three rollers which are unevenly spaced.

17. The carriage as claimed in claim 15 having a depth adjustment frame for the support axle wherein the depth adjustment frame is movable from a non operative position clear of the ground to an operative position where the ground aeration mechanism penetrates the ground.

18. The carriage as claimed in claim 17 wherein the depth adjustment frame has a pair of side rails and each crank support an adjacent side rail thereof.

19. The carriage as claimed in claim 17 wherein each crank interconnects the support axle and the roller axle and is pivotally attached to the support axle and the roller axle.

20. The carriage as claimed in claim 15 wherein there is provided a pair of cranks supporting the depth adjustment frame on opposite sides thereof.

21. A carriage attachable to a prime mover for travel over turf or grass, said carriage having:
   (i) a ground aeration mechanism mounted on a support axle;
   (ii) a plurality of rollers each mounted on a respective roller axle;
   (iii) a housing having a hollow interior which houses the support axle and said one roller axle;
   (iv) a mounting frame for pivotal attachment to a prime mover support frame; and
   (v) a mount spaced from the mounting frame for pivotal attachment to the prime mover support frame.

* * * * *